United States Patent [19]

Eppel

[11] 4,277,167

[45] Jul. 7, 1981

[54] DEPTH MAPPING SYSTEM

[75] Inventor: Joseph C. Eppel, Wayne, Pa.

[73] Assignee: The United States of America as represented by the Secretary of the Navy, Washington, D.C.

[21] Appl. No.: 721,630

[22] Filed: Aug. 25, 1976

[51] Int. Cl.³ .......................... G01C 3/08; H04N 7/00
[52] U.S. Cl. ................................. 356/5; 250/207; 356/2; 358/96
[58] Field of Search .................. 356/5, 2; 250/207; 358/96

[56] References Cited

U.S. PATENT DOCUMENTS

| | | | |
|---|---|---|---|
| 3,278,753 | 10/1966 | Pitts et al. | 356/5 |
| 3,446,555 | 5/1969 | Kahn | 356/5 |
| 3,527,533 | 9/1970 | Hook et al. | 356/5 |
| 3,604,803 | 9/1971 | Kahn | |
| 3,743,418 | 7/1973 | Heflinger | 356/5 |

*Primary Examiner*—S. C. Buczinski
*Attorney, Agent, or Firm*—R. S. Sciascia; Henry Hansen; William J. Iseman

[57] ABSTRACT

A depth mapping system is carried from an aircraft flying above the water. A pulsed laser directs a pulse at a predetermined water area and a multi-apertured photomultiplier tube receives backscattered or reflected radiation signals from both the air-water interface and a submerged surface. A signal comparator simultaneously compares each of the reflected radiation signals against the air-water interface radiation signal and drives a CRT display which illustrates the depth of the reflecting surface over the predetermined area.

8 Claims, 5 Drawing Figures

DEPTH MAPPING SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention relates generally to depth mapping systems and particularly to a system wherein a plurality of depths of a submerged surface are simultaneously displayed.

In mapping the depth of an ocean bottom or of an object of interest submerged within a water body. It is particularly desirable that any depths developed as a result of such a mapping system be simultaneously presented as a family of depths which, taken as a whole, present an integrated picture of a preselected area of the water bottom. One example of such a system used to determine depth in an ocean body utilizes a pulsed laser system and a single aperture receiver which sequentially pulses and then processes the signal information to provide a discrete piece of depth information. Succeeding items of information are then sequentially provided by further laser pulses and corresponding processing. Such systems are often susceptible to pulse variations within the laser system which can introduce significant errors into the resultant information.

SUMMARY OF THE INVENTION

Accordingly, it is an object of the present invention to provide a depth mapping system which simultaneously exhibits a plurality of depths representative of a predetermined submerged surface area. Another object of the invention is to provide a mapping system having a pulsed laser which provides a single pulse directed into a water body to cause the simultaneous generation of a plurality of interrelated depths. A further object of the present invention is to provide a multi-apertured photomultiplier tube having the apertures thereof prearranged in a grid for simultaneously producing a plurality of interrelated depths.

Briefly, these and other objects are accomplished by a depth mapping system having a pulsed laser which directs a single pulse at a predetermined water area and a multi-aperture photomultiplier tube which receives backscattered radiation signals generated as a result of the single laser pulse from both the air-water interface and submerged surface. A signal comparator simultaneously compares each of the submerged surface radiation signals, as received in a grid determined by the operational characteristics of the photomultiplier tube, against the air-water interface radiation signal and drives a CRT display which ilustrates the depths of the submerged surface over the predetermined area. The respective depths illustrate relationships between one another in a display calibrated in three dimensions and in transformation registration with the apertures of the photomultiplier tube.

For a better understanding of these and other aspects of the invention, reference may be made to the following detailed description taken in conjunction with the accompanying drawings.

DESCRIPTION OF THE PREFERRED EMBODIMENT

Figure 1:
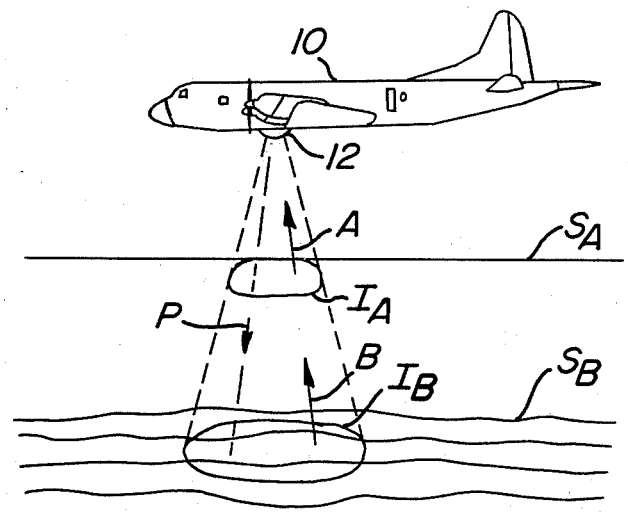
FIG. 1 illustrates an area of ocean which can be scanned by the system of the present invention.

Referring now to FIG. 1, there is shown an airplane 10 having a depth mapping system attached underneath the fuselage thereof. A pulse P is directed from the system 12 downwardly into an area of an ocean body defined by the air-water interface surface $S_A$ and a plurality of water bottom contoured surfaces $S_B$. In the course of traveling from the airplane 10 downwardly towards the water, the pulse P spreads outwardly and illuminates a first area $I_A$ at the surface $S_A$, and a second area $I_B$ on the water bottom surface $S_B$. As will be explained with greater detail hereinafter, a plurality of backscattered radiation pulses are received from both the area $I_A$ which is exemplified by the return pulse A, and the area $I_B$ which is exemplified by the return pulse B.

Figure 2:
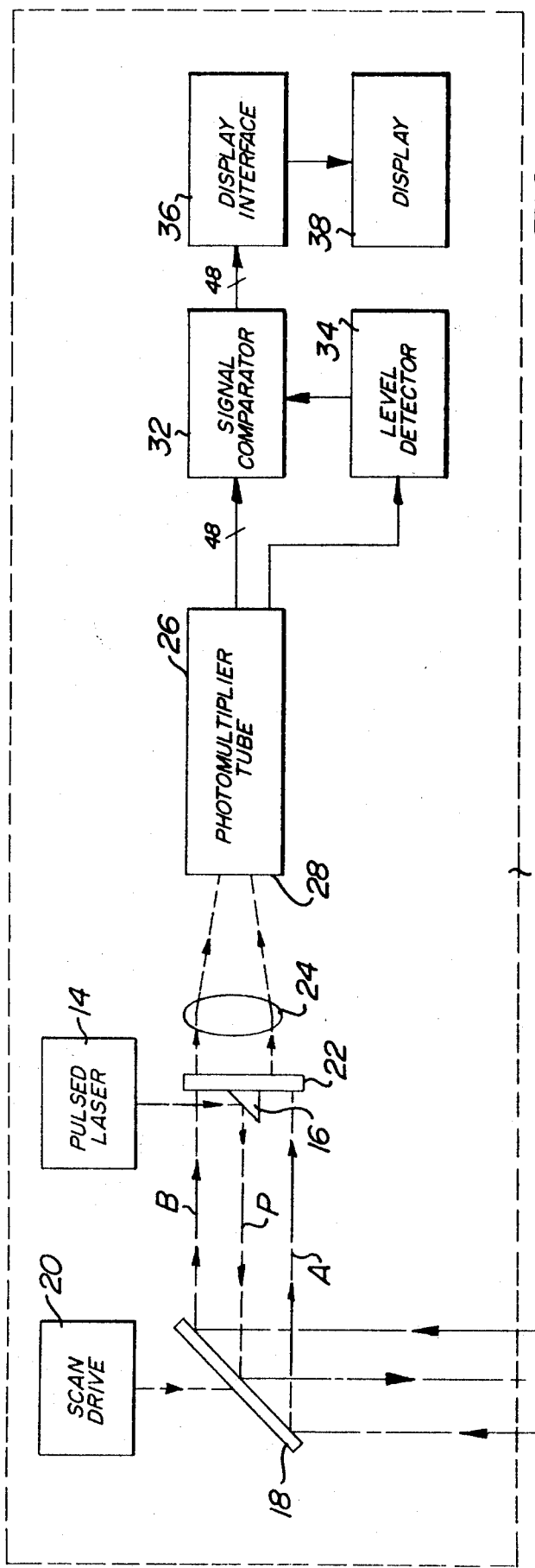
FIG. 2 is a block diagram of the system according to the present invention.

Referring now to FIG. 2, there is shown a block diagram of the processor system 12 as used within the present invention. A pulsed laser 14 directs an output pulse P towards a prism 16 which reflects the pulse P towards a scanning mirror 18 which is selectively rotated by a mechanical interconnection to a conventional scan drive 20. The pulse P is reflected by mirror 18 outwardly from the system 12 and towards the ocean body as noted in FIG. 1. The mirror 18 also serves to receive the backscattered radiation pulses A and B as noted in FIG. 1 and reflects these pulses along with other backscattered radiation pulses (not shown) towards a filter 22 which passes the incoming radiation pulses to a focusing lens 24. The lens 24 focuses the radiation pulses towards a multi-apertured photomultiplier tube 26 having a screen 28 adapted to receive the incoming radiation. The tube 26 provides a first output to a first input of a signal comparator 32 and a second output to a level detector 34 whose output is connected to a second input of the comparator 32. The comparator 32 provides an output to a display interface 36 whose output is connected to a display 38.

Figure 3:
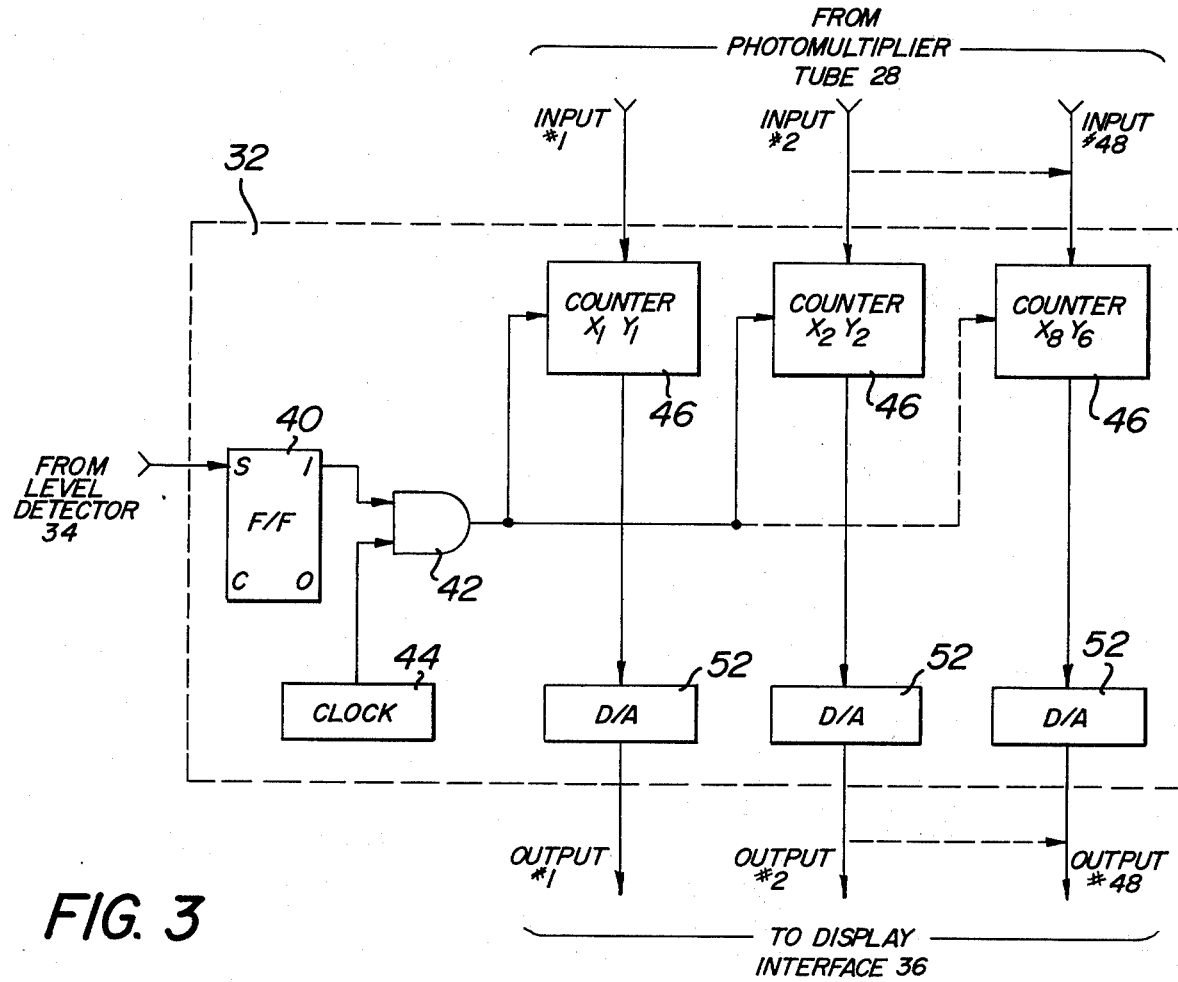
FIG. 3 is a block diagram of the signal comparator noted in FIG. 2 of the invention.

Referring now to FIG. 3, there is shown a block diagram of the signal comparator 32 noted in FIG. 2. The second output of the photomultiplier tube 26 is connected to the set input of a flip-flop 40. The corresponding "1" output of the flip-flop 40 is connected to one input of an AND gate 42 whose second input is connected to receive an output from a clock 44. The output of the AND gate 42 is commonly connected to the clock inputs of a plurality of forty eight counters 46. Each of the counters 46 has an inhibit input line connected, respectively, to each of the forty eight outputs from the photomultiplier tube 26. Outputs from each of the counters 46 are connected, respectively, to inputs of digital to analog converters 52 which provide, respectively, a plurality of forty eight outputs for connection to the display interface 36.

Figure 4:
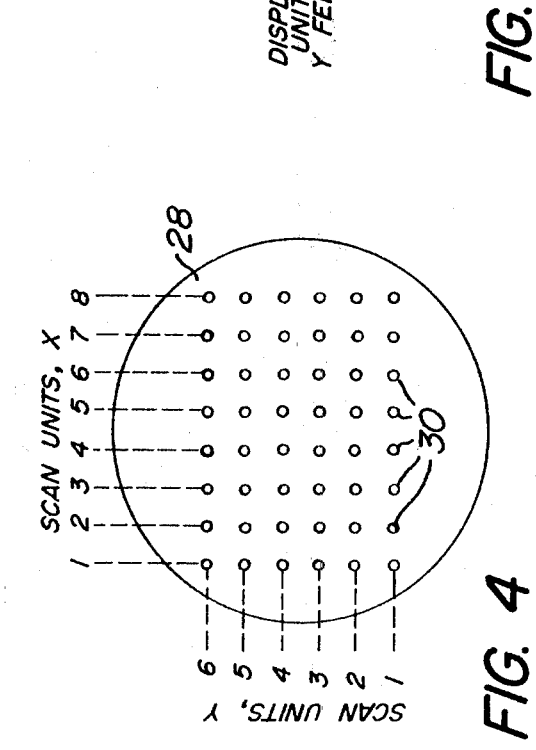
FIG. 4 illustrates the front screen of the photomultiplier tube shown in FIG. 2 of the invention.

Referring now to FIG. 4 there is shown a front view of the screen 28 of the photomultiplier tube 26. The screen 28 is provided with a plurality of forty eight apertures 30 arranged in an 8×6 grid such that the Y excursion of the grid is divided into six scanning units and the X excursion of the grid is divided into eight scanning units.

Figure 5:
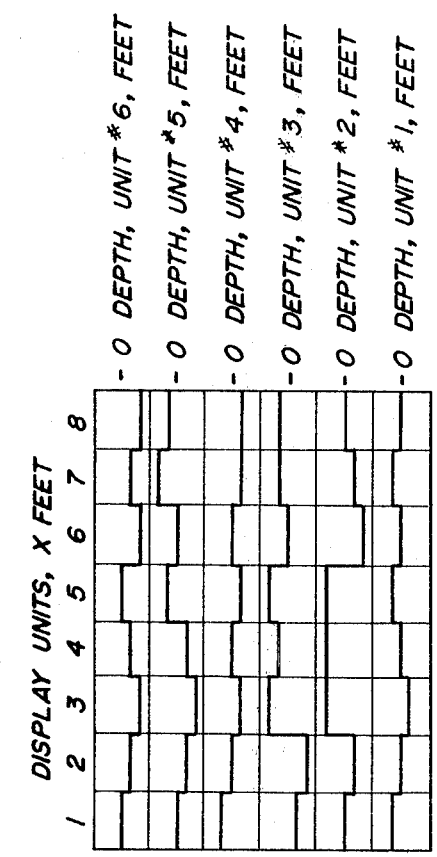
FIG. 5 illustrates the display of a plurality of depths as generated by the system of the present invention.

Referring now to FIG. 5 there is illustrated a typical depth mapping display as will be generated by the present invention and illustrated on display 38 noted in FIG. 2. The display is calibrated in a series of six display units in the Y direction and a series of eight display units in the X direction. This display is designed to be a one-on-one grid transformation from the scanning units and apertures of the photomultiplier tube onto a rectangular grid which is now calibrated in units of feet. Moreover, each of the scanning lines formed across the X display units is further calibrated as to depth with the lowermost boundary of the Y display units forming the zero depth. The height of any individual line within a respective grid unit defined by the X and Y display units will therefore determine the depth of the water bottom surface or other submerged surface within that particular area as scanned by the photomultiplier tube 26.

Referring again to FIGS. 1-5, the operation of the invention will now be explained. The airplane 10, while flying over a water body, causes the projected laser pulse, which is typically in the blue green spectrum, to be directed downwardly into the water body and to spread about respective illuminated areas $I_A$ and $I_B$. The pulse, as generated by the laser 14, may be directed into a preselected area of the water body or succeeding preselected areas thereof by motion of the scanning mirror 18 as controlled by the scan drive 20. Backscattered radiation such as exemplified by the pulse A received from the air-water interface and the pulse B received from the bottom contours of the water body are collected by the scanning mirror 18 and directed through the filter 22. The filter 22 is tuned to pass only the backscattered wavelengths of interest, such as blue-green wavelengths if used in conjunction with an ocean body, and to reject all other radiated signals. The filtered rays are then passed from the filter 22 through the focusing lens 24 onto the screen 28 of the photomultiplier tube 26. It is intended that the scanning mirror 18 will be driven by the scan drive 20 in such a manner that the optimum amount of backscattered radiation is properly focused onto the matrixed apertures 30 of the tube 26. Although shown in the preferred embodiment as a mechanical scanning arrangement, the photomultiplier tube apertures 30 may also be scanned with electronic means well known to those skilled in the art. Once having focused the backscattered radiation onto the apertures of the tube, each of the apertures processes the incoming radiation to provide an output signal on one of the forty eight output signal lines coming from the photomultiplier tube 26. The second output from the tube 26 is connected to any one of the forty eight output lines from the apertures 30 and is connected to the input of the level detector 34. In operation, the first backscatter signal to be received from the water body as a result of directing a laser pulse therein will be the signal reflected from the air-water interface. Assuming a substantially level water surface $S_A$, each of the forty eight apertures of the photomultiplier tube will receive the backscattered interface signal at substantially the same time, hence any one of the outputs generated from the apertures is suitable to drive the level detector 34.

Experience has shown that the backscattered signal received from the air-water interface will be substantially larger in magnitude than any succeeding signals from the water bottom or a submerged object. Consequently, the level detector 34 is set to provide an output signal to the comparator 32 only when the greater magnitude of the backscattered interface signal is received and thus discriminates between the air-water interface backscattered signal and other radiated signals having lesser magnitudes. The signal comparator 32 receives the output signal from the level detector 34 which sets flip-flop 40 to activate AND gate 42 for the passage of clock signals generated by the clock 44. Each of the counters 46, respectively identified as corresponding to discrete apertures within the screen 28 of the tube 26, begin counting upon receipt of the signals from the clock 44. As the various backscattered signals are sensed by the respective apertures of the photomultiplier 26 in time sequence according to the depth of the water body or submerged object, the forty eight input lines to the comparator 32 become activated to sequentially inhibit the counters 46. Accordingly, each of the counters 46 registers a count indicative of a time relationship between the reception of a first backscattered pulse from the air-water interface and the reception of a second backscattered pulse from a particular preselected area of the water bottom surface. The digital to analog converters 52 each receive, respectively, the output from the counters 46 and convert the counter outputs to an analog form for further processing by the display interface 36. The interface 36 arranges the incoming analog data into a grid format suitable for illustration on the display 38 and which is further illustrated in FIG. 5. Accordingly, when viewing the display of FIG. 5 it is noted that the grid area defined by display units $X_1Y_6$ corresponds to the radiated information detected by the aperture 30 shown in FIG. 4 located according to scan units $X_1Y_6$. The height of the signal level shown in the grid area $X_1Y_6$ of FIG. 5 is indicative of the signal level received from the respective analog converter 52 in the comparator 32 which corresponds to the depth of the water bottom or submerged object within that particular portion of the illuminated area. Provided with a sufficient number of apertures within the scanning area of a multi-apertured receiver tube, the many depths can be easily provided for greater resolution and a more realistic indication of the true contours of the water body or submerged object.

Thus it may be seen that there has been provided a novel laser mapping system for simultaneously presenting a plurality of depth of a preselected water bottom area or submerged object.

Obviously many modifications and variations of the invention are possible in light of the above teachings. It is therefore to be understood that within the scope of the appended claims the invention may be practiced otherwise than as specifically described.

What is claimed is:
1. A depth mapping system for a selected body of water, comprising, in combination:
light means formed to direct a pulsed light beam onto the water surface and submerged bodies therebeneath;
receiving means having an array of light receptors each formed to receive reflections of the beam from discrete and separate areas of the water surface and the submerged bodies for producing a first signal when the water surface reflection is re- ceived, and a second signal when each submerged body reflection is received from its respective area; and signal processing means connected to receive said first and second signals for producing a display corresponding to said array indicative of the depth of respective surface areas of said submerged bodies.

2. A contour mapping system according to claim 1 wherein said receiving means further comprises:

light reflecting means optically connected to receive the light beam and the reflections from the air-water interface and from the submerged bodies for directing said light beam towards said submerged bodies and for collecting said reflections from the interface and from the submerged bodies;

filter means optically connected to receive the collected reflections from said light reflecting means for transmitting selected ones of said reflections having a predetermined wavelength; and focusing means optically connected to receive the filtered reflections from said filter means for focusing said filtered reflections into said array of light receptors.

3. A mapping system according to claim 2 wherein said receiving means further comprises a photomultiplier tube having a plurality of apertures arranged on the screen thereof according to said array for producing said second signals on respective output terminals when reflections are received by said apertures.

4. A mapping system according to claim 1 wherein said signal processing means further comprises:

level detecting means connected to receive the first signal for producing a third output signal when said second signal exceeds a predetermined level;

comparator means connected to receive each of said second signals and said third signal for providing fourth signals each indicative of the time difference between said third signal and respective ones of said second signals; and display means connected to receive each of said fourth signals for displaying the depths of the submerged surface according to said array.

5. A mapping system according to claim 4 wherein said signal comparator means further comprises:

a plurality of counters, each of said counters connected to receive a respective one of said second signals and operatively connected to receive the third output signal for producing output counts indicative of the respective time difference therebetween and conversion means connected to receive respective ones of said output counts from said counters for converting each of said output counts to respective output signal levels indicative of the respective counts.

6. A mapping system according to claim 5 wherein said pulsating light source is a laser.

7. A mapping system according to claim 6 wherein said display means comprises a cathode ray tube operatively connected to receive said signal level outputs from said conversion means for displaying the depths of the submerged bodies according to the array.

8. A mapping system according to claim 7 wherein said array is formed of n×m units, said n and m units defining the two dimensional coordinates of the depths of the submerged bodies.

* * * * *